(12) United States Patent
Ameti et al.

(10) Patent No.: US 8,149,169 B1
(45) Date of Patent: Apr. 3, 2012

(54) EXTENSIBLE OBJECT LOCATION SYSTEM AND METHOD USING MULTIPLE REFERENCES

(75) Inventors: Aitan Ameti, Germantown, MD (US); Keming Chen, Herndon, VA (US); Robert J. Fontana, Potomac, MD (US); Edward A. Richley, Gaithersburg, MD (US); Belinda Turner, Germantown, MD (US)

(73) Assignee: Multispectral Solutions, Inc., Germantown, MD (US)

( * ) Notice: Subject to any disclaimer, the term of this patent is extended or adjusted under 35 U.S.C. 154(b) by 0 days.

(21) Appl. No.: 12/769,105

(22) Filed: Apr. 28, 2010

Related U.S. Application Data

(63) Continuation of application No. 11/331,229, filed on Jan. 13, 2006, now Pat. No. 7,710,322.

(60) Provisional application No. 60/679,235, filed on May 10, 2005.

(51) Int. Cl.
*G01S 3/02* (2006.01)
(52) U.S. Cl. ........................................... 342/464
(58) Field of Classification Search ........... 342/459–465
See application file for complete search history.

(56) References Cited

U.S. PATENT DOCUMENTS

| | | | |
|---|---|---|---|
| 3,419,865 A | 12/1968 | Chisholm | |
| 3,680,121 A | 7/1972 | Anderson et al. | |
| 3,714,573 A | 1/1973 | Grossman | |
| 4,740,792 A | 4/1988 | Sagey et al. | |
| 4,916,455 A | 4/1990 | Bent et al. | |
| 5,119,104 A * | 6/1992 | Heller | 342/450 |
| 5,166,694 A | 11/1992 | Russell et al. | |
| 5,216,429 A | 6/1993 | Nakagawa et al. | |
| 5,317,323 A | 5/1994 | Kennedy et al. | |
| 5,920,287 A | 7/1999 | Belcher et al. | |
| 6,054,950 A | 4/2000 | Fontana | |
| 6,094,169 A | 7/2000 | Smith et al. | |
| 6,121,926 A | 9/2000 | Belcher et al. | |
| 6,882,315 B2 * | 4/2005 | Richley et al. | 342/465 |
| 7,710,322 B1 * | 5/2010 | Ameti et al. | 342/465 |
| 2003/0234741 A1 | 12/2003 | Rogers et al. | |
| 2005/0280578 A1 * | 12/2005 | Boyd | 342/465 |

* cited by examiner

*Primary Examiner* — Thomas Tarcza
*Assistant Examiner* — Nga X Nguyen
(74) *Attorney, Agent, or Firm* — Alston & Bird LLP

(57) ABSTRACT

An ultra wideband (UWB) or short-pulse RF system is disclosed that can be used to precisely locate or track objects (such as personnel, equipment, assets, etc.) in real-time in an arbitrarily large, physically connected or disconnected, multipath and/or noisy environment. A system implementation includes multiple zones or groups of receivers that receives RF signals transmitted by one or more timing reference tags and one or more objects having associated object tags. Each zone or group may share a common receiver. By combining a multiple reference tag system with a virtual group of receivers, i.e., a zoning technique or system, a cost-effective system can be provided that offers scalability and flexibility to monitor a significantly expanded coverage area.

21 Claims, 7 Drawing Sheets

EXTENSIBLE OBJECT LOCATION SYSTEM AND METHOD USING MULTIPLE REFERENCES

CROSS-REFERENCE TO RELATED PATENT APPLICATIONS

This application is a continuation of U.S. application Ser. No. 11/331,229, filed Jan. 13, 2006, issued as U.S. Pat. No. 7,710,322, which claims the benefit under 35 U.S.C. §119(e) of Provisional Application Ser. No. 60/679,235 filed May 10, 2005 in the names of the same inventors hereof, entitled "Extensible Object Location System and Method Using Multiple References", which are hereby incorporated herein in their entirety by reference.

BACKGROUND

This invention relates to a radio frequency ("RF") object location method and apparatus. More specifically, this invention relates to system architecture, as well as an improved calibration method and apparatus for precisely locating an object(s) in an arbitrarily large, physically connected or disconnected multipath, and/or noisy environment.

RF location systems are used to keep track of objects such as inventory, materiel, equipment, personnel, or other items. In such systems, objects to be located typically have associated transmitters or transponders, commonly referred to as active RF tags. To locate the object, various techniques have previously been used to process received signals.

In prior systems, RF sensors (also referred to as "monitoring stations") were positioned at known coordinates within and/or about an area to be monitored. RF emissions from associated object tags were received and processed by these sensors. Signal processing schemes included measuring relative signal strength, angle of arrival (AOA), or time differences of arrival (TDOA or DTOA) at the respective sensors. Typically, systems based upon TDOA determined differences in the arrival time of the signal from the tag at one monitoring station relative to other monitoring stations. Measurement of the time difference was often accomplished using a digital counter whose count was latched in response to receipt of an incoming RF signal. Systems based upon such TDOA measurements were sometimes referred to as "multilateration" or "geolocation" systems, which refer to the process of locating a signal source by solving for the mathematical intersection of multiple hyperbolae, determined by the differences of arrival times between signals received at multiple sensors.

In another class of prior systems described, for example, in U.S. Pat. No. 4,740,792 and commonly-owned, incorporated U.S. Pat. No. 6,054,950, untethered monitoring stations relayed received signals via wireless links to a central measurement unit. Although well-suited for monitoring object locations in large outdoor areas, or in applications where wiring was not feasible or too expensive to install, this approach required a transmitter and receiver at each station.

In another class of prior systems (cf. U.S. Pat. Nos. 3,714,573; 5,216,429; 5,920,287; and 6,121,926), tethered monitoring stations relayed radio frequency signals via cables to a central measuring unit. One drawback of this approach was signal dispersion in the cable. Generally, dispersion is a process by which an electromagnetic signal propagating in a physical medium becomes degraded due to various wave components, or frequencies, of the signal propagating at different velocities within the medium. Dispersion reduces the edge-rate or rise/fall times of the signals thereby degrading the ability of the system to accurately detect arrival time, and hence, to determine the position of the object.

In yet another class of prior systems (cf. U.S. Pat. Nos. 3,419,865; 3,680,121; and 4,916,455), measurement schemes were implemented at each of the monitoring stations to produce a digital result indicative of arrival times, angle of arrival, or other value. Advantageously, these systems conveyed digital data via interconnecting cables; and hence, position accuracy was not affected by cable dispersion. However, a drawback of this approach relates to the fact that these systems are plesiochronous, or "nearly" synchronous; i.e., timing reference signals were arbitrarily close in frequency (within some specified limits), but were not sourced from the same clock signal. Thus, over some period of time, the timing reference signals drifted with respect to each other. As each monitoring station had an independent clock source, small differences in clock frequencies degraded accuracy in position measurement, which worsened over time.

Yet another class of prior systems included synchronous systems, i.e., those in which the timing reference signals were derived from a common source. In some synchronous systems (cf. U.S. Pat. Nos. 5,317,323 and 6,094,169), a local timing reference clock was derived from a Global Positioning Satellite (GPS) timing source. While this was suitable for frequency synchronization in benign outdoor conditions, monitoring stations operating indoors or in urban environments could not generally rely upon receiving a GPS timing signal, and consequently, object location could not be determined.

U.S. Pat. No. 5,119,104, for example, describes a synchronization scheme in which a timing reference clock was provided at each monitoring station receiver by way of a local area network (LAN) cable. At each monitoring station, the clock signal incremented a digital counter that latched a count value upon receiving an RF signal arriving at an associated receiver of the monitoring station. Advantageously, this particular approach guaranteed that all counters operate at the same clock frequency. However, a drawback was the lack of a provision to reset the counters or otherwise control the relative phase between them. Non-compensated phase offset between counters degraded position accuracy. Furthermore, in the system described in the '104 patent, the monitoring stations included a data communication controller that responded to the receipt of an object tag transmission and, upon receipt thereof, sent a corresponding time of arrival (TOA) detection packet to a centrally located processor. In other words, such system was interrupt-driven where receipt of a tag transmission signal invoked an interrupt. A drawback of this approach was that, upon receiving a first tag transmission, the system was temporarily "disarmed" and thus unable to process a second tag transmission until the network completed the transfer of measurement data. Thus, it was possible that one or more tag transmissions were lost in the process.

Phase offset between counters among the respective monitoring stations can be controlled by a synchronizing or counter reset signal. U.S. Pat. Nos. 3,680,121 and 4,916,455, for example, disclose object location systems utilizing an RF synchronizing signal that was transmitted to each monitoring station in the monitored region. To avoid interference, the synchronizing signal was transmitted at a frequency distinct from that of the tag transmission. Thus, one drawback of this approach was that each monitoring station had to be equipped with two distinct RF receivers—a first to sense the tag transmission and a second to sense the synchronization signal. Alternatively, the system disclosed by U.S. Pat. No. 3,419,865 included a cable interconnecting a central unit and each monitoring station to enable "adjusting their time clocks to precise mutual synchronization." A drawback of this approach, however, was signal dispersion in the cable, which reduced pulse sharpness and timing accuracy of the synchronizing signal.

Synchronizing or calibration methods applicable to radio frequency location systems are also known (cf. U.S. Pat. Nos. 4,916,455; 5,119,104; and 6,094,169). A general synopsis of a calibration technique is provided in the '455 patent, in which it is stated that "[i]n order to achieve the high accuracy, the system was periodically calibrated. System calibration was accomplished by periodically transmitting a modulated signal (with a unique calibration identity code) from a known location. The transition times of arrival derived therefrom were then transmitted to a central analyzer for time-difference processing. The resulting time differences were then compared to known values and error magnitudes were then used to compensate corresponding station-pair time differences resulting from other unknown-location transmissions."

The need for calibration is also summarized in the '104 patent as follows. "To operate the radiolocation system with TOA resolution in nanoseconds, minute changes in circuit operational parameters and signal propagation characteristics, such as might result from changes in temperature and humidity within the facility, had to be taken into account. Such changes were accommodated through system calibration".

Another problem unique to determining object location or to track assets is that, in order to accurately determine position, a minimum number of receivers at the monitoring stations (i.e., typically three receivers) must have a direct (i.e., a line-of-sight or, at most, an attenuated line-of-sight) transmission path. However, due to the nature of indoor environments, there may only be a limited number of such direct transmission paths. For example, walls, machinery, containers, and other materials may create signal attenuation or even complete signal blockage. Thus, there may exist certain zones within the monitored region in which position accuracy may be degraded for lack of adequate signal reception. A solution to this problem was to provide redundant monitoring stations. However, in providing such redundancy, it becomes possible, and in fact likely, that more than the minimum number of monitoring stations will receive a given transmission. Such a system is often referred to as an "over-specified" or "over-determined" system.

A potential drawback of using an over-determined system relates to the fact that hyperbolic ranging algorithms can calculate more than one mathematically valid position. That is, ambiguities in position determination can arise. Various techniques have been applied to address this issue. For example, U.S. Pat. No. 5,166,694 discloses a method of computing a vehicle location in an overdetermined system. One aspect of the '694 patent is the use of a pre-filter to "remove any signals that were corrupted by anomalies in the propagation of the transmitted signal." In particular, the specification thereof describes a "multipath feasibility circle" that is determined by a system parameter that is an estimated maximum speed of the vehicle containing the transmitter. A drawback of this approach is that it is possible for a signal to have a propagation anomaly and yet not produce an error sufficiently large enough to be rejected or filtered out.

In commonly-owned, incorporated U.S. Pat. No. 6,882,315, many of the above noted problems were resolved, and highly accurate (e.g., +/−1 foot or better) position measurements were obtained using a measurement apparatus utilizing ultra wideband (UWB) signals disposed at each of the monitoring stations; a timing reference clock to synchronize the frequency of counters within respective monitoring stations; and a reference transmitter positioned at known coordinates to enable accurate determination of the phase offset between counters.

In the '315 patent, a single reference tag transmitter enabled precise determination of phase offsets for a given set of monitoring stations. A single-reference tag system, however, had limitations in certain situations.

First, the reference signal from single reference transmitter must be received at each and every one of the monitoring stations. Given the peak and average power constraints imposed upon all licensed and unlicensed transmitting devices by the Federal Communications Commission (FCC), there is a maximum range over which reception can be reliably achieved. For example, in one embodiment of a UWB tracking system, the reference tag transmission is capable of being reliably received outdoors at ranges of approximately 650 feet, and indoors (depending upon obstructions) at ranges of approximately 200 to 300 feet. With a worst case range of 200 feet from reference tag to monitoring station (UWB receiver), a single reference tag system has a maximum coverage area of approximately 40,000 square feet, which may not be adequate for certain applications.

Secondly, as noted above, the single reference tag must be placed at a fixed site having direct transmission paths to all of the individual monitoring stations. In indoor applications, this can be quite challenging, and sometimes impossible, when obstructions (e.g., steel-reinforced concrete walls, machinery, metal doors, etc.) create significant signal attenuation or even complete signal blockage.

While one solution to such limitations would be to replicate the object location system with a new reference transmitter supplied for each replication, cost constraints ultimately limit the benefit of such a simple approach. For example, this approach would typically require significantly more receivers than necessary for area coverage. Furthermore, there are numerous implementation geometries (described further below) in which a single reference tag may not be sufficient to overcome signal blockages, resulting in a system with either increased measurement inaccuracies or dead zones in which no positional data can be extracted.

It is thus desirable to have a precision object location system or method capable of monitoring large areas (e.g., hundreds of thousands to millions of square feet), while offering flexibility to overcome signal blockages extant in realistic environments, and that may use a reduced set of receivers for complete area coverage.

In view of the foregoing, it is a feature of the present invention to provide highly accurate position measurements (e.g., +/−1 foot or better) by providing a measurement apparatus or method, preferably using UWB signals, that is operable at each of the monitoring stations; a timing reference clock to synchronize respective frequency of counters (or other timers) within the monitoring stations; and one or more reference transmitters, preferably UWB transmitters, positioned at known coordinates within a monitored region to enable accurate determination of phase offsets between respective timers or counters of the monitoring stations.

It is another feature of the present invention to use a multiple reference tag algorithm and virtual group, or zoning, technique that permits geolocation of tags over multiple monitored areas, where the areas are contiguous (e.g., in a mosaic pattern), overlapping, or even fully separated by some distance. Such a system affords much greater coverage and system scalability, while maintaining the high positioning accuracy achievable with a single reference system.

In commonly-owned U.S. Pat. Nos. 6,054,950 and 6,882,315 referenced above, ultra wideband (UWB) waveforms were employed to achieve extremely fine, centimeter-type resolution because of their extremely short (i.e., subnanosecond to nanosecond) durations. This invention also utilizes UWB, or short pulse, technologies to provide an improved object locating system and method for asset tracking that addresses the above-mentioned shortcomings of prior systems. The apparatuses and methods identified herein are equally applicable to wideband pulse and spread spectrum RF technologies with some sacrifice in position accuracy.

Other aspects, features, and advantages of the invention will become apparent upon review of the succeeding description taken in connection with the accompanying drawings. The invention, though, is pointed out with particularity by the appended claims.

SUMMARY OF THE INVENTION

In accordance with a first aspect of the invention, there is provided a system to determine a position of an object in any one of multiple zones of a region where the object has an associated object tag that transmits an RF signal. Such an embodiment comprises a receiver group in each zone that includes multiple receivers wherein at least one of the receivers of one zone is included in a receiver group of at least one other zone. A cyclic timer associated with each receiver detects an arrival time of an RF signal, which may be an ultra wideband signal. A common clock source synchronizes the frequency of cyclic timers of each receiver thereby to produce phase offsets between cyclic timers of the different receivers of the group. A reference tag associated with each receiver group transmits an RF reference signal (which may also be an ultra wideband signal) from a known location to enable determination of timing offsets. A processing hub in communication with the receivers determines the position of the object according to timing offsets and time differences of arrival of RF signals transmitted by the object tag.

In a further embodiment, the common clock source includes a daisy-chained cable to convey clock signals to the receivers and the processing hub includes a data cable to convey digital representations of the time differences of arrival of said RF signals. In yet a further embodiment, the cyclic timers comprise digital counters that are synchronized in frequency, but not necessarily in phase, by the common clock source. Optionally, the receiver groups may be arranged in a pattern to define a matrix of rows and columns of zones. Alternatively, the receivers and reference tags may be arranged substantially in a ring configuration to encircle a region of interest within which to detect an object having an associated object tag. The reference tags may also transmit an ID code to distinguish among multiple reference tags when determining object location according to time difference of arrival. Further, the processor may determine offsets of timers in a group according to offsets of other timers in a contiguous group having a shared receiver.

In accordance with another embodiment of the invention, there is provided a zone-based object location system to determine a position of an object in one of multiple zones of a region that comprises respective groups of receivers that respectively define zones where at least one receiver is common to at least two zones. Each receiver has a cyclic timer (e.g., free-running digital counter) to measure an arrival time of an RF signal (e.g., a wideband or ultra wideband signal). A clock source (preferably common to all receivers) locks the phase relations of the timers relative to each other and a reference tag associated with each the zones transmits an RF signal from a known location of the zones. A processing hub obtains time-of-arrival information indicative of arrival times of RF signals transmitted by the object and reference tags at receivers of a receiver group whereby to determine the position of the object within a zone. Optionally, the processor may obtain digital representations of time-of-arrival information via a digital data cable.

In yet a further embodiment of the invention, there is provided a zone-based object location system to determine a position of an object in one of multiple zones of a region comprising receiver groups that define said zone where each receiver group includes multiple receivers and each receiver includes a free-running digital counter to measure an arrival time of an ultra wideband signal, a common clock to lock the counters in relative phase relationship via a daisy-chained cable, a reference tag associated with each zone to transmit an ultra wideband signal from a known location in order to provide a timing reference, and a processing hub to obtain digital representations of time-of-arrival information indicative of the timing reference and arrival times of the ultra wideband signals transmitted by the object tag whereby to determine the position of the object.

In yet another embodiment of the invention, there is provided an extensible zone-based object location system to determine a position of an object in any one of multiple zones of a region comprising respective groups of receivers that define respective zones where at least two zones share a receiver and where each receiver includes a timer to measure an arrival time of an RF signal, a reference tag associated with each zone to transmit an RF signal from a known location, and a processing hub to obtain time-of-arrival information indicative of arrival times of RF signals transmitted by said object tag and reference tag whereby to determine the position of the object within said zone.

A further embodiment of the invention comprises a method of determining the position of an object having an associated object tag that transmits an RF signal. This embodiment comprises the steps of providing respective groups of receivers to define respective zones in a monitored region in which to detect said object wherein at least two zones share a receiver, transmitting a reference signal from a fixed location relative to a group of receivers of a zone, receiving the reference signal at each receiver of said group of receivers to determine a timing offset among the receivers of the group, transmitting an object tag signal within the zone, receiving the object tag signal at the receivers of a group of receivers, and computing object location based on offsets and time of arrival differences of the object tag signal at multiple receivers within said zone. When cyclic timers are used to measure offsets, they may comprise free-running counters and said receiving step may further include indexing the cyclic timers by a common clock source to produce unitary increments of time indicative of said timing offset. Further, the method may include arranging the zones to define around RF barriers within a monitored region and/or the determining step may utilize time offset information to discriminate against reflected signals within a zone.

In yet a further aspect of the invention, an extensible object location method to determine the position of an object having an associated object tag that transmits an ultra wideband signal comprises providing respective groups of receivers to define respective zones of a monitored region in which to detect the object wherein at least two groups share a common receiver, providing a reference tag transmitter to transmit a reference signal from a known location with respect to each zone, receiving the reference signal at each receiver of a zone thereby to determine a timing offset for the receivers of the zone, transmitting a object tag signal within the zone, receiving the object tag signal at each receiver of said zone, and determining the position of said object based on the timing offsets among receivers and differences in time of arrival of the object tag signal at the receivers within the zone.

A further embodiment comprises an extensible object location method to determine the position of an object having an associated object tag that transmits an RF signal wherein the method comprises providing successive receivers to at least partially encircle a monitored region in which to detect an object, providing a reference tag transmitter substantially between each of the receivers to transmit a reference signal from a known location, receiving the reference signal at least two receivers thereby to determine timing offsets for at least two receivers, transmitting an object tag signal from the monitored region, receiving the object tag signal at the at least two receivers, and determining the position of the object based on the timing offsets and differences in time of arrival of the object tag signal at the at least two receivers.

Other aspects and embodiments will become apparent upon review of the following description taken in conjunction the accompanying drawings. The invention, though, is pointed out with particularity by the appended claims.

BRIEF DESCRIPTION OF THE DRAWING(S)

DETAILED DESCRIPTION OF ILLUSTRATIVE EMBODIMENTS

Figure 1:
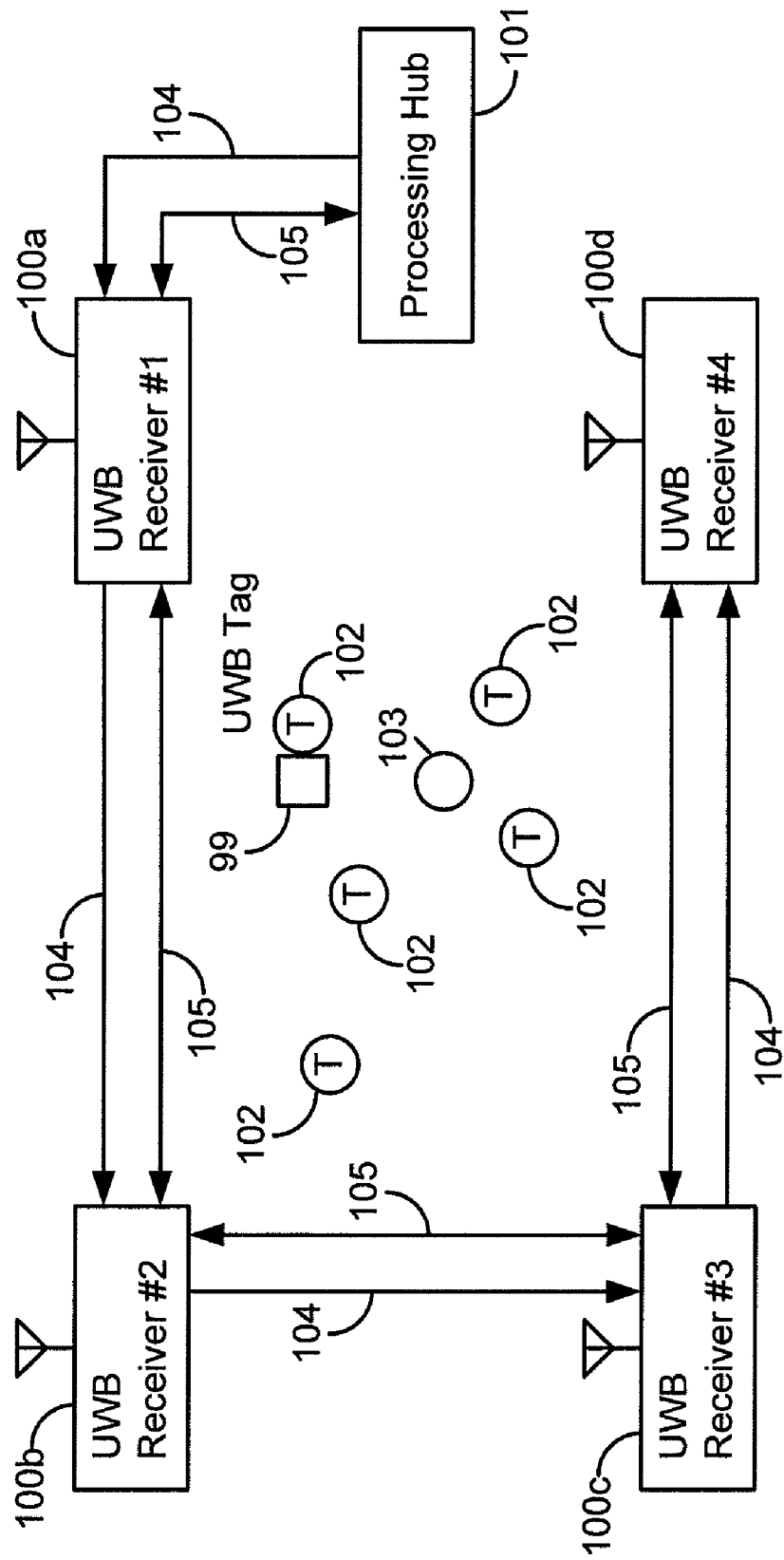
FIG. 1 illustrates an object location system having receivers arranged in a daisy-chain interconnection.

FIG. 1 illustrates a prior radio frequency (RF) object locating system utilizing a single fixed reference tag transmitter that provides time-of-arrival reference information to enable a processor to determine the position of an object in a monitored region generally located between and about a number of monitoring stations 100a, 100b, 100c, and 100d. A stationary or mobile object 99 to be located has an associated or co-located object tag transmitter 102, such as a UWB or wideband transmitter, that transmits a short packet burst for TOA or DTOA timing, and optionally, an information packet that may include, but not be limited to, identification information (ID) information and/or a sequential burst count specifying a sequence number of the transmitted burst when multiple bursts are transmitted. At least one other transmitter, depicted as reference transmitter 103, is positioned within and/or about the monitored region.

In FIG. 1, one or more (preferable three or more) monitoring stations 100a, 100b, 100c, and 100d being substantially identical or similar in structure and/or function are also positioned at predetermined coordinates within and/or around the monitored region. The monitoring stations detect signals transmitted by the object tag 102 and the reference tag transmitter 103. Each of the monitoring stations 100a-100d includes a receiver that receives tag transmissions (preferably UWB transmissions); and preferably, a packet decoding circuit that extracts a TOA timing pulse train, transmitter ID, packet number and/or other information that may have been encoded in the tag transmissions (e.g., materiel description, personnel information, etc.).

In addition, each of the monitoring stations 100a-100d includes a timer or time measuring circuit to measure or detect the arrival time of a tag transmission. The time measuring circuit is frequency-locked with a common, e.g., digital, reference clock signal distributed via cable from a central timing reference clock generator, preferably contained within Processing Hub 101. Thus, multiple time measuring circuits of the respective monitoring stations 100a, 100b, 100c, and 100d are synchronized in frequency, but not necessarily in phase. While there typically may be a phase offset between any given pair of receivers in the monitoring stations, the offset is readily determined through use of reference transmitter 103, as described in the commonly-owned, incorporated U.S. Pat. No. 6,882,315.

FIG. 1 shows a "daisy chained" architecture in which a Processing Hub 101 feeds power and clock signals to UWB Receivers 100a-100d in the monitoring stations in a serial fashion via a Power and Clock Cable 104. Each UWB Receiver, in turn, forwards the power and clock signals to the next UWB receiver in a serial chain. Similarly, time-of-arrival and data from the UWB Receivers is sent back in serial fashion through the monitoring stations 100a-100d to the Processing Hub 101 via a Serial Data Interface Cable 105. In one embodiment, the Power and Clock Cable 104 and the Serial Data Interface Cable 105 are simply separate wires within a single cable, e.g., CAT-5 or CAT-6 local area network cable.

Figure 2:
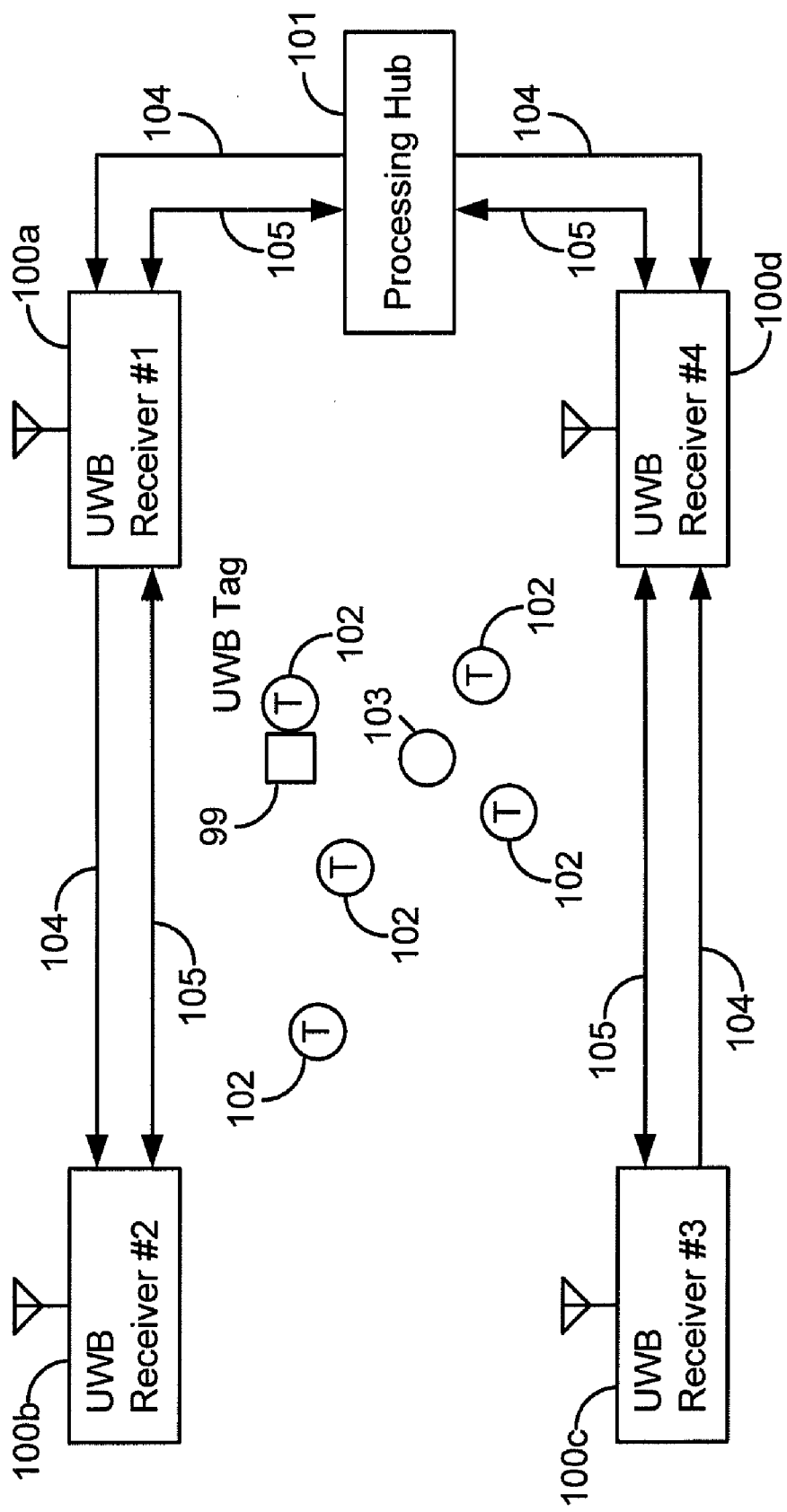
FIG. 2 illustrates an object location system having receivers configured using a combination of star and daisy-chain interconnections.

FIG. 2 shows an alternative prior art embodiment of FIG. 1 in which the Processing Hub 101 and UWB receivers in the monitoring stations form two distinct serial chains comprising stations 100a and 100b in a first chain, and stations 100c and 100d in a second chain. Receivers #1 and #2 form part of the first chain while Receivers #3 and #4 form part of the second. While only two distinct chains are shown, the arrangement is readily extensible to an arbitrary number of distinct serial chains of receivers. Such a "star" or "hub and spoke" architecture provides considerably more flexibility for system installation and eliminates the single-point failure mode of a serial "daisy chained" architecture of FIG. 1. However, with only a single reference tag 103, placement of the UWB receivers still may be constrained by the requirement that each of the receivers 100a-100d receive direct line-of-sight transmissions from reference tag transmitter 103, which may significantly limit the coverage.

As described in the commonly-owned U.S. Pat. No. 6,882,315, a reference tag transmitter synchronizes the receiver's timing devices (e.g., delay lines, free-running digital counters, etc. that latch or record count values representing unitary increments of time defined by delay line taps or counter frequency at which the RF signal is sensed or detected) in order to provide time-of-arrival information from each target or object tag associated with the object(s) being located. The reference tag transmitter is positioned to be clearly visible via line-of-sight to all receivers. A typical installation, for example, would have the reference tag transmitter located roughly at the center of the area of coverage or the monitored region.

Figure 3:
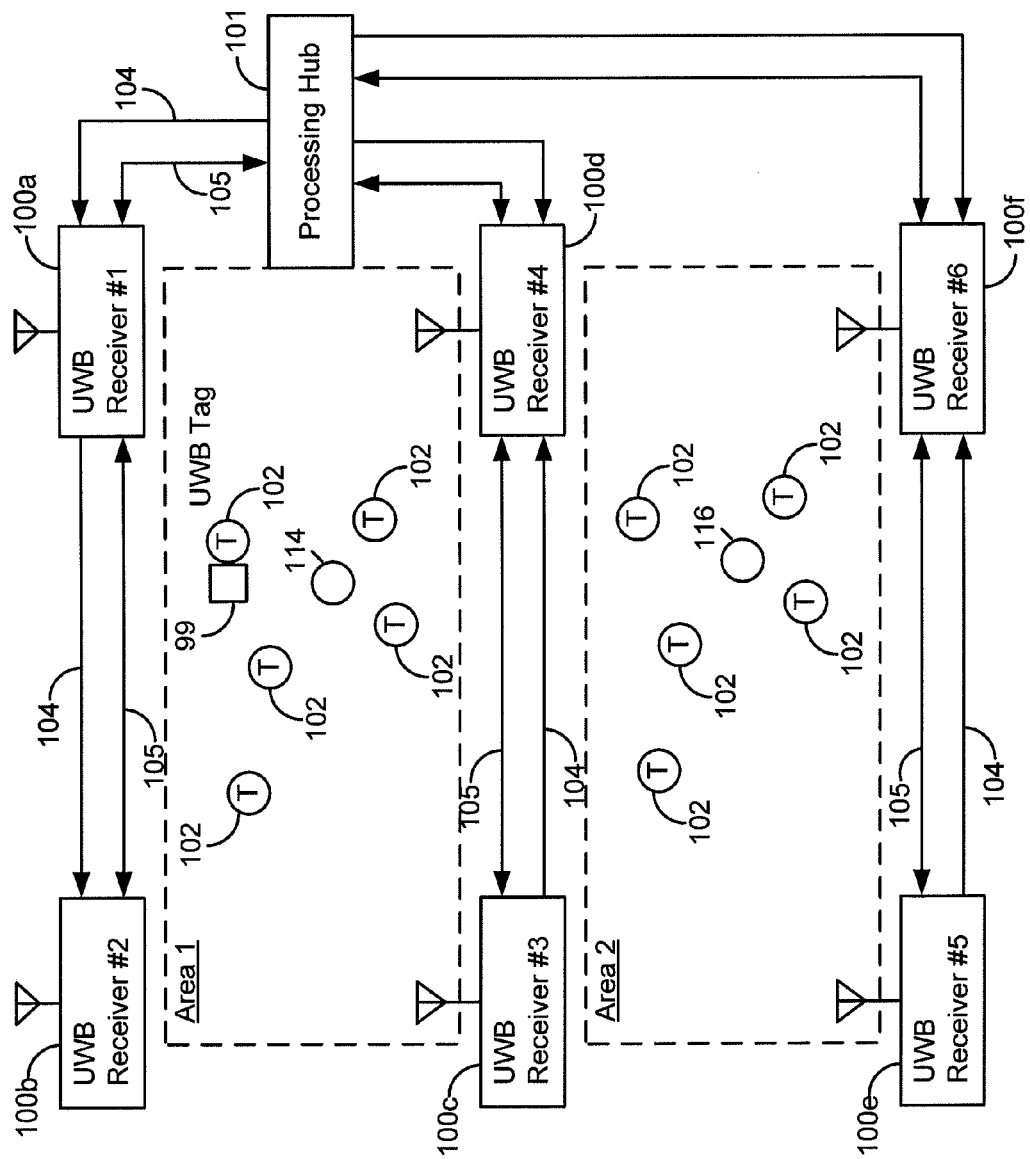
FIG. 3 shows an example of an object location system according to the present invention where multiple reference tags are deployed in respective zones of a monitored region.

In an improved object location system or method according to an aspect of the present invention, however, the system or method involves deployment of multiple reference tag transmitters (herein called "reference tags") so as to cover multiple distinct areas or zones defined in the monitored region by the monitoring stations. As illustrated in FIG. 3, these areas or zones 110 and 112 may be overlapped, or annexed to each other, or even separated by a distance. FIG. 3 exemplifies a multi-reference mode of deployment in which two reference tags 114 and 116 are respectively placed in the two separate zones 110 and 112. Zone 110 includes a reference tag 114 as well as receivers #1, #2, #3, and #4 respectively located monitoring stations 100a, 100b, 100c, and 100d. Zone 112 includes a reference tag 116 as well as receivers #3, #4, #5, and #6 respectively located in monitoring stations 100c, 100d, 100e, and 100f. In this example, receivers #3 and #4 are effectively shared by zones 110 and 112 to monitor both zones 110 and 112. Similar to the single reference tag mode, all tag data captured by the receivers are transferred to the central processing hub unit 118 for processing to compute object location. Software in processing hub 118 implements a multi-reference mode algorithm, which is subsequently described.

A processor in the central processing hub uses digital representations of time differences of arrival (TDOA) of the tag transmissions received at the various monitoring stations to determine object location. The object may be fixed or mobile. Positioning is achieved by performing a gradient search (or mathematical equivalent search) for the optimal tag position (having unknown coordinates x, y and z) to minimize the following error function:

$$\varepsilon = \sum_{i=1}^{N} \left[ \sqrt{(x-x_i)^2 + (y-y_i)^2 + (z-z_i)^2} - c(t_i - t_0) \right]^2 \quad (1)$$

where N is the number of receivers at monitoring stations, c is the speed of light, $x_i$, $y_i$ and $z_i$ are the coordinates of each $i^{th}$ receiver, and $t_i$ is the arrival time of an object tag transmission (which may also include a message) at the $i^{th}$ receiver. The unknown dummy variable $t_0$ represents a transmission time of the tag transmission in an absolute time epoch. The optimization proceeds, for example, through the use of a non-linear optimization technique such as the Davidon-Fletcher-Powell (DFP) quasi-Newton algorithm. Since there are four variables (x, y, z, $t_0$) in the error function $\varepsilon$, a minimum of four receivers are required in order to unambiguously determine the three-dimensional (3D) position of an object tag. To resolve a two-dimensional (2D) position, at least three receivers are required; while for one-dimensional positioning, tag transmission data from only two receivers is necessary.

From equation (1), it is easy to observe that the time difference of arrival (TDOA), rather than the absolute time of flight (TOF), affects the object tag position result (x, y, z) within the optimization process. For example, if an arbitrary time offset is added to each arrival time $t_i$ (i.e., $t_i \rightarrow (t_i + t)$ for i=1 to N), the effect would be equivalent to setting the unknown temporal parameter $t_0 \rightarrow (t_0 \rightarrow t)$. In other words, the net result would be the same for the solution of the object tag coordinates (x, y, z).

Thus, without loss of generality, the error function can be re-written as $$\varepsilon = \sum_{i=1}^{N} \left[ \sqrt{(x-x_i)^2 + (y-y_i)^2 + (z-z_i)^2} - c(\Delta t_{ij} - t_0) \right]^2 \quad (2)$$

where $\Delta t_{ij}$ is the difference in the time of arrival for a tag transmission received by receiver i and j, where j is any index from 1 to N. That is, j denotes a common receiver ID from which all TDOA data are measured with respect to.

In order to determine the values of $\Delta t_{ij}$, one or more reference tags are required to calibrate counter (or timing) offsets between different receivers. Exemplary counters in the receivers run at same clock frequency since they have the same clock source (e.g., sent by cable 104 from the hub 118); however, the counters could start at different times and hence likely have very different offsets. Receiver clocks in stations 100a-100f are not typically phase-locked with a clock of any other receiver in the monitoring stations. Hence, an additional counter offset could be induced by clock skew due to different cable lengths and unmatched internal delays within the receiver clock circuits.

Let $\Delta R_{ij}$ be the counter offset between receivers i and j. Assume that a reference tag pulse transmission is captured by each of receivers i and j with time counter values of $C_i$(ref) and $C_j$(ref), respectively. Counter offset may then be determined by the relationship:

$$\Delta R_{ij} = [C_j(\text{ref}) - D_j(\text{ref})/c] - [C_i(\text{ref}) - D_i(\text{ref})/c] \quad (3)$$

where $D_i$(ref) and $D_j$(ref) represent the distances from the reference tag to receivers i and j, respectively. Since one knows each reference tag location ($x_{ref}$, $y_{ref}$, $z_{ref}$) as well as the coordinates of each receiver, these distances may be very accurately determined a priori.

It is important to note that the counter offset $\Delta R_{ij}$ will be held constant as long as the system runs without any power interruption to the receivers. This is due to the fact that the receivers in the illustrated embodiment share the same clock source and use exactly the same clock frequency for incrementing their respective time counters. Instead of using counters as timing devices, alternative timing circuits or methods a may come to those skilled in the art based on the teachings herein may also be effectuated to achieve the same or similar result. Thus, the invention is not limited to digital counters as a means to measure elapsed time. In addition, instead of using a Cartesian coordinate system as illustrated by equations (1) and (2), processing to determine object location may be accomplished using other geometric or coordinate representations of position, such as spherical polar coordinates or cylindrical polar coordinates. Moreover, certain aspects of the invention are not limited to using timer offsets to computer object location but instead embraces geolocation systems and methods, generally.

A transmission signal burst from a reference tag then produces one measurement of the quantity $\Delta R_{ij}$, and periodic bursts from the same, or even different reference tags, provide continuously updated corrections to these $\Delta R_{ij}$ measurements. A determination of the value for $\Delta R_{ij}$ can thus be achieved with sub-nanosecond accuracy, providing the basis to obtain sub-foot resolutions of tag positions.

Before starting the optimization process to compute object tag position, a complete set of timing offsets $\{\Delta R_{ij}\}$ between the receivers (which are participating in a particular position computation) must first be measured or determined. Note that $\Delta R_{ii}=0$ and $\Delta R_{ij}=-\Delta_{ji}$ for all i and j indices so that only $N(N-1)/2$ measurements and computations are required.

Once the timing offset values are available, the time differences of arrival $\{\Delta t_{ij}\}$ for an object tag can be calculated from the time-stamp measurements at the receivers as follows:

$$\Delta t_{ij}=[C_j(\text{tag})-C_i(\text{tag})]-\Delta R_{ij}. \quad (4)$$

where $C_i(\text{tag})$ and $C_j(\text{tag})$ are, in the illustrated embodiment, time counter values of the object tag burst captured at receivers i and j, respectively. From a set of N such count values (i=1 to N and j any fixed index), the Davidon-Fletcher-Powell (DFP) algorithm, or equivalent, is used to minimize the error function (eq. 2) which yields an optimal estimate for the true object tag position (x, y, z).

With a single reference tag, as noted above, all receivers whose time counter values used in the optimization procedure must have a direct line-of-sight path to the reference tag. However, with multiple reference tags as shown in FIG. 3, multiple "reference groups" are defined for the respective zones 110 and 112, with each group within a zone comprising a reference tag, e.g., tag 114, and a group of receivers assigned to that specific reference tag, e.g., receivers #1, #2, #3, and #4 of monitoring stations 100a, 100b, 100c, and 100d. The reference group is so configured such that each receiver within the group has a direct line-of-sight path to its corresponding reference tag. In this case, counter offsets are measured between receivers within each reference group, similar to the case using a single reference tag.

However, by allowing one or more receivers (i.e., receivers 100c and 100d) to be included in two or more such reference groups (i.e., zones 110 and 112), it is possible to dramatically improve system coverage while minimizing the total number of receivers and corresponding infrastructure cost. As a specific example, assume that receivers i and k reside in one reference group, having reference tag $T_{ik}$ (while receivers j and k are in a second reference group, having a separate reference tag $T_{jk}$. Receiver k acts as a "bridging receiver" for computing the counter offsets between receivers within the two separate groups as follows. The counter offsets $\Delta R_{ik}$ and $\Delta R_{jk}$ can be directly measured as described above. The counter offset between receivers i and j, which lie in separate reference groups, is simply determined by the relationship $$\Delta R_{ij}=\Delta R_{ik}-\Delta R_{jk}. \quad (5)$$

In similar fashion, all counter offsets between receivers within the same or different reference groups can be determined. Note that, if a reference tag signal is detected by a receiver not within the reference group assigned to this tag, the signal data can be discarded by the processing hub. This process can be readily extended to multiple reference groups by providing one or more bridging receivers for each reference group pair.

In each "reference group," a set of receivers may be assigned to one specific reference tag. One can also define a "virtual group" of receivers in which a set of receivers is assigned to one specific zone or field of coverage. The zone boundary, or field of coverage, for a virtual group is defined as a user-selectable region in which all active tags within the region are expected to have direct transmission paths to all receivers within the virtual group. Advantageously, a "virtual group" need not coincide with a "reference group". Indeed, a virtual group may use a subset of receivers from within a reference group, or may comprise receivers from more than one reference group. In the latter case, a virtual group can be used to restrict the participation of certain receivers in a given computation, minimizing the probability that "bad" data (i.e., data from indirect, or reflected paths) is used in the computation of location.

The physical sub-regions or zones assigned to virtual groups can be overlapped, next to each other, or even separated by some non-zero distance. However, in the minimization of the error function (eq. 2), one limits the set of TDOA data to that data measured from receivers within the virtual group only.

Through a combination of "reference groups" and "virtual groups," one can significantly improve the scalability and flexibility of a precision object location system, expanding system capacity in terms of area coverage while maintaining the same high degree of accuracy for tag position measurements. The following examples illustrate these features.

Example

Mosaic Receiver Pattern

Figure 4:
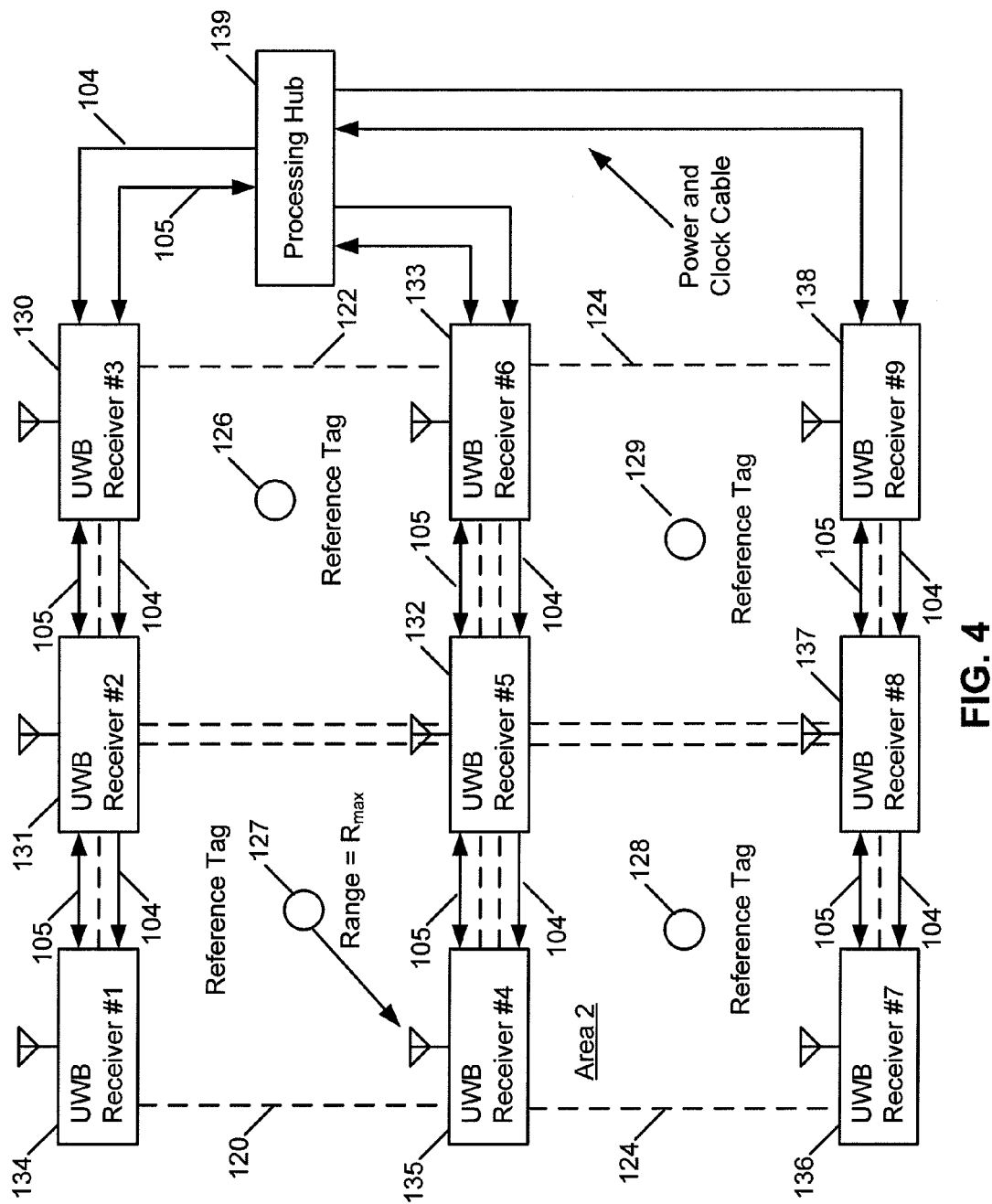
FIG. 4 illustrates another aspect of an object location system according to the present invention where coverage is expanded using multiple reference tags in multiple zones of a monitored region.

In a single reference tag system, the area of coverage is essentially limited by the maximum range achievable from reference tag to the receivers. This maximum range, in turn, is limited by regulatory constraints (e.g., FCC Part 15 rules for unlicensed radiators), blockages or attenuation from building materials and obstructions, tag placement required to prevent erroneous returns from signal bounce off metal walls, etc. If the maximum range achievable for any of the above reasons is $R_{max}$, then the coverage area is approximated by $2R_{max}^2$ as shown in FIG. 4. However, using a set of N reference tags (e.g., tags 126, 127, 128, and 129) and a set of N reference groups (e.g., receiver groups respectively covering zones 120, 122, 124, and 126), the entire group of receivers of monitoring stations 130-138 may be arranged in a pattern (mosaic or otherwise) that provides an expanded coverage area of approximately $2NR_{max}^2$, resulting in a greatly expanded area of coverage. Coverage area is scalable with any number of reference tags and reference groups. Note that, unlike a set of four independent single reference tag systems requiring sixteen receivers, the same coverage area is handled using only nine receivers and three additional reference tags. This provides a significant cost reduction as the wired infrastructure costs are minimized and seven of the more costly receivers are replaced by three low cost reference tags. Furthermore, unlike the independently operating single reference tag systems with each requiring its own hub processor, the multiple reference system may utilize a single processor 139 connected to all receivers, as shown in FIG. 4.

It is noteworthy that the individual reference groups covering zones 120, 122, 124, and 126 need not be physically next to each other as in the mosaic configuration in FIG. 4. They may also be overlapped, or even separated by some distance, provided the connection (e.g., CAT-5 cables) between receivers 130-138 and processing hub 139 provide stable power and clock signals, as well as reliable serial communications. Such flexibility is very advantageous, for example, in the case that one or more separated rooms or regions need to be monitored for tag locations.

Example

Signal Blockage Problem

Figure 5:
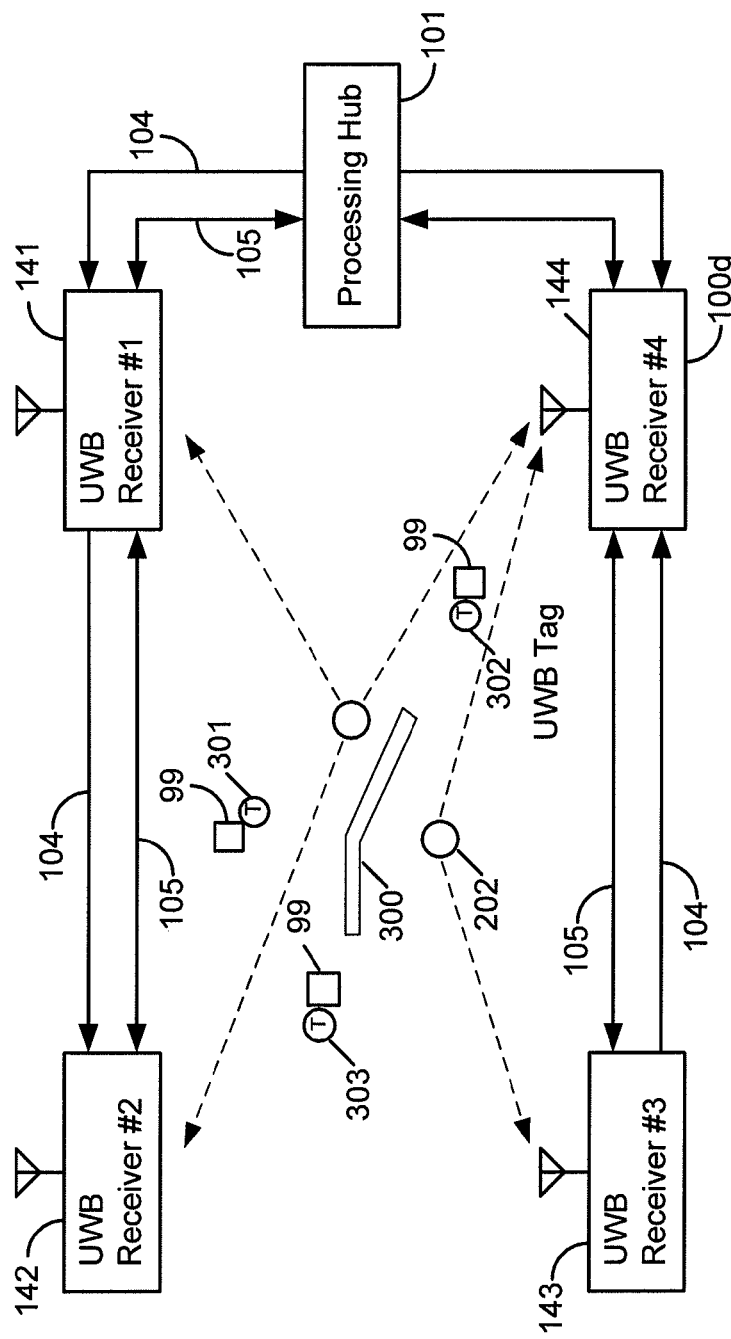
FIG. 5 illustrates how the use of multiple reference tags according to the present invention may overcome signal blockage.

A limitation of a system using a single reference tag is possible blockage of direct transmission paths between the reference tag and one or more of the receivers. As noted above, a direct transmission path from the reference tag to the receivers must be established in order to generate a full matrix of all timing or counter offsets ($\Delta R_{ij}$). However, due to the nature of an indoor environment, there may only be a limited number of such unobstructed, direct transmission paths. For example, walls, machinery, and other obstacles may create signal attenuation or even complete signal blockage from certain tag locations, negating the ability to use a single reference system or method. In FIG. 5, for example, reference tag 201 has direct line-of-sight paths only to three monitoring stations 141, 142, and 144 (i.e., UWB Receivers #1, 2 and 4) while the transmission path to station 143 (Receiver #3) is completely blocked by an RF barrier 300 thereby preventing a single reference tag design from working properly.

With a multiple reference system as shown in FIG. 5, another reference tag 202 is placed on the other side of the RF opaque barrier 300 so that direct line-of-sight paths become available to receivers #3 and #4 of monitoring stations 143 and 144. The set of receivers #1, #2 and #4 of stations 141, 142 and 144 are then assigned to reference group 1 using reference tag 201, and another set of receivers #3 and #4 of monitoring stations 143 and 144 are assigned to reference group 2 using reference tag 202. With reference tag 201, the timing offsets between receivers #1, #2 and #4 within reference group 1 may be directly measured using equation (3). Similarly, the timing offset between receivers #3 and 4 of reference group 2 may be determined using data from reference tag 202. Finally, using equation (5), the timing offset between the two groups of receivers can be determined as well, resulting in the unambiguous determination of a full matrix of timing offsets between all receivers.

Object tag positions within any of the zones can now be calculated. For example, object tag 301 can only be detected by receivers #1, #2 and #4, but this is sufficient to accurately determine its two-dimensional position. In similar fashion, object tag 302 can be detected by receivers #1, #3 and #4, and object tag 303 can be detected by receivers #1, #2 and #3. Hence, the positions of each of these object tags can be readily measured with the multiple reference tag system. This would not have been possible using a single reference approach in the presence of signal blockage exemplified by RF barrier 300.

It is, of course, critical to accurately measure the time differences of arrival of an RF signal between the different receiver sites. Any faulty measurement of signal arrival time can result in a significant error in computing object tag position. Note also that only the direct transmission path should be measured to determine the true time-of-flight. This is implemented in the receiver by treating the first received signal as the direct transmit signal, since any reflected signals will arrive at later times. However, this approach has a potential drawback in a severe multipath environment, in the case when only bounced signals reach the receivers; i.e., no direct path exists.

Figure 6:
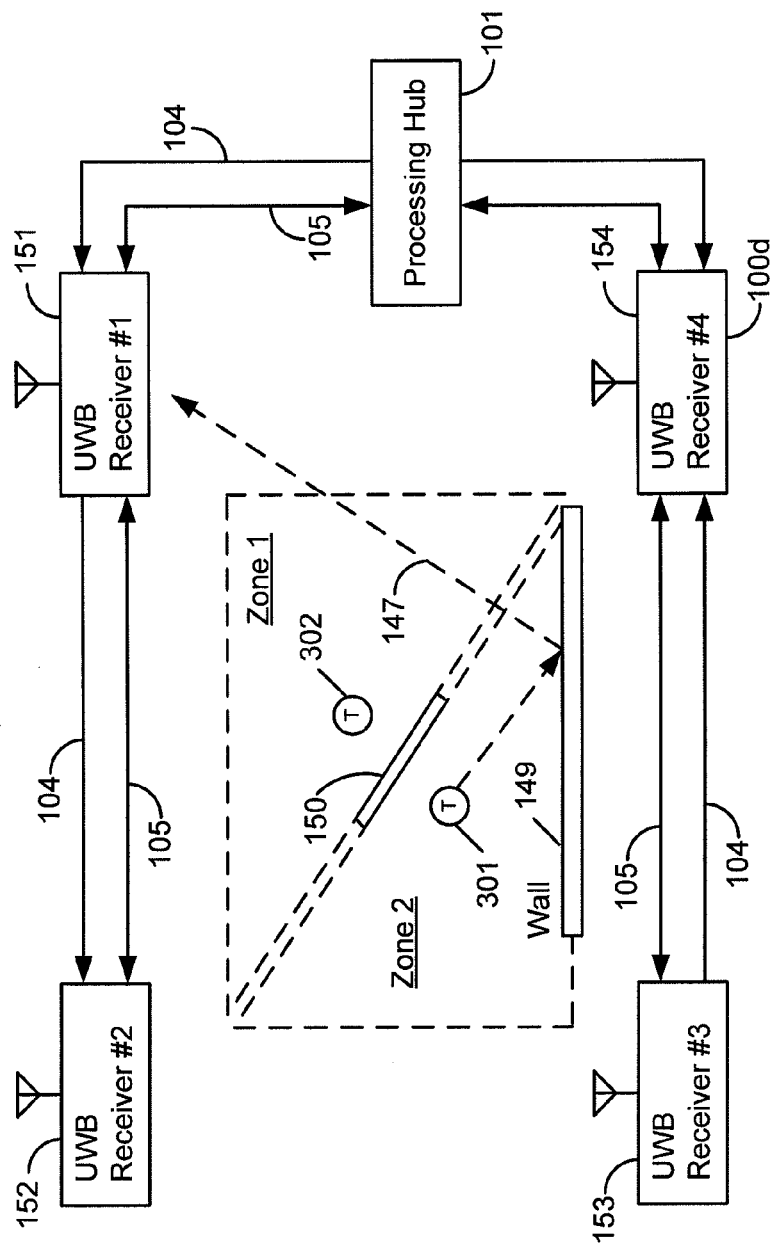
FIG. 6 illustrates how a bounced signal can cause a faulty TDOA measurement at a particular receiver.

For example, as illustrated in FIG. 6, the direct transmission path between tag 301 and receiver #1 is blocked, but a bounced signal along path 147 (e.g. reflected by a side wall 149) may still reach the receiver 151. Receiver 151 detects the reflected signal, and measures its time-of-flight time, which would be larger than that from a signal propagating along a direct transmission path from tag 301 to receiver 151. This faulty measurement would result in a significant positioning error.

To solve this problem, a virtual group technique supported by multiple reference tags may be used. Note that the virtual group technique may be based on either reference tags and/or object tags. For a virtual group assignment based upon reference tags 301 and 302, the user assigns a group of receivers to each reference tag, making sure that each receiver within the reference group has a direct line-of-sight path to its respective reference tag.

Conversely, the virtual group technique can also be used when computing the positions of object tags. That is, the field of interest is subdivided into multiple zones. Each such zone is defined by its boundary and a virtual group of receivers which fully cover the zone. In this case, any tag within a particular zone must have a direct line-of-sight path to the receivers within its virtual group. Note that this is a bit more complex than for virtual groups based upon reference tag as, in the latter case, only propagation paths from a single point location need to be examined.

Tag positions are then determined based upon TDOA measurement data taken within each virtual group. If a tag signal is detected by more than one virtual group, it may be possible to compute more than one position for a tag. In this case, the system can filter out redundant data using the following criterion: If the resulting tag position determined by a virtual group is located outside of its zone boundary, the data is marked as invalid and discarded. In effect, the zoning technique helps to exclude the faulty arrival time data (of some receivers) from the computational process to minimize the error function. Thus, a high accuracy tag position measurement can be achieved.

FIG. 6 illustrates how a virtual group technique may be used to minimize the positional error under severe multipath conditions. Consider two virtual groups for zones 1 and 2. The virtual group for Zone 1 includes receivers #1, #2 and #4 of monitoring stations 151, 152, and 154, while the virtual group for Zone 2 includes receivers #2, #3 and #4 of monitoring stations 152, 153, and 154.

A reflected signal from tag 301 within Zone 2 might be detected by receiver #1 within Zone 1, resulting in a faulty TDOA measurement at receiver #1. Since one does not know a priori which zone the tag position is in, the system will compute the tag positions from both virtual groups. However, the result from the first virtual group computation would indicate that the tag position is outside of its zone boundary (Zone 1). Consequently, the position data, which has a large error due to the faulty TDOA measurement, will be silently discarded before it is reported to the end user. On the other hand, the computation from the second virtual group including receiver #2, #3, and #4 would result in a position data within its zone boundary (Zone 2). This data, which does not have any faulty TDOA measurements from the virtual group, is then reported to the user. As a result, only the position data with high accuracy is reported.

Figure 7:
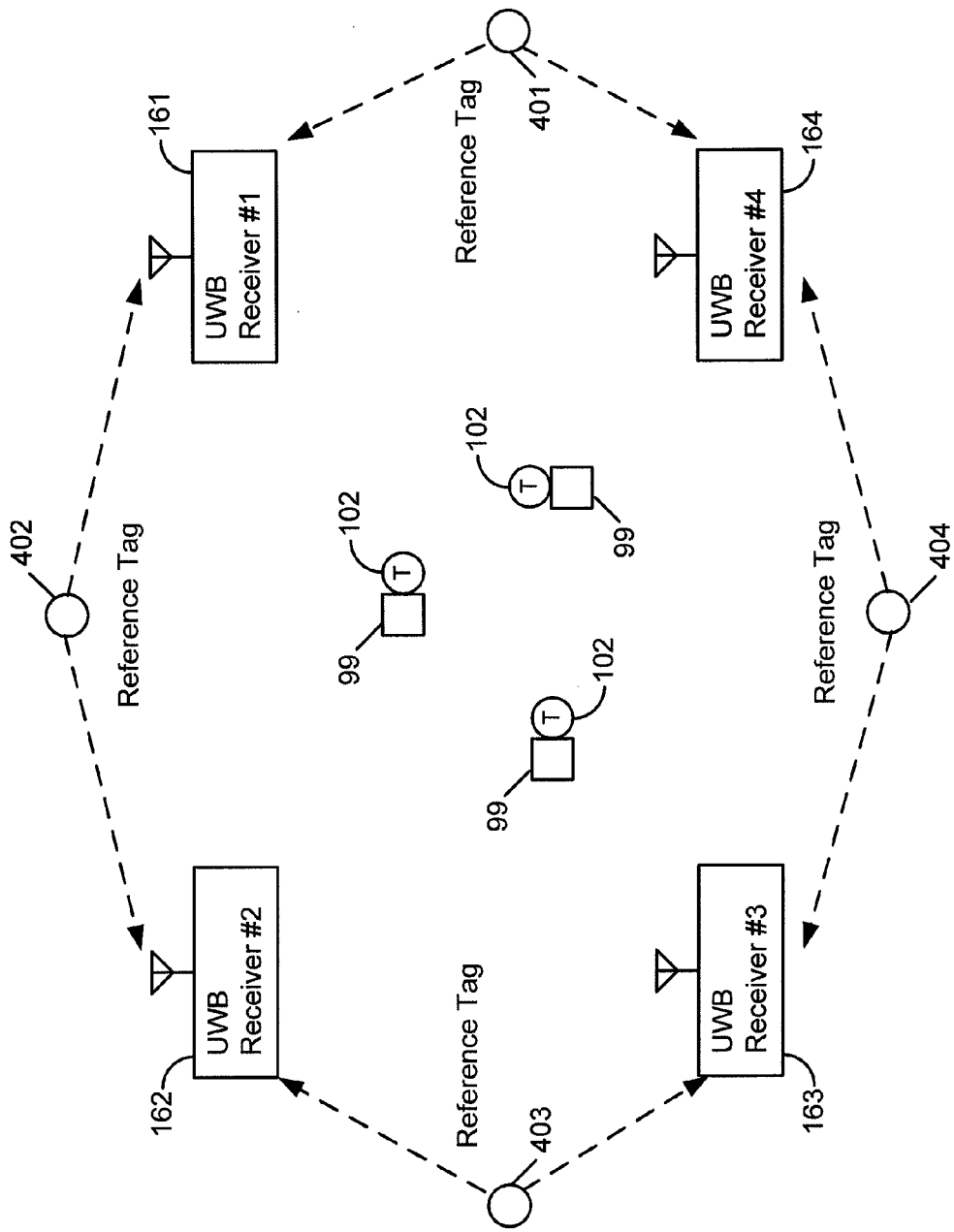
FIG. 7 shows a system configuration according to another aspect of the present invention in which multiple reference tags are position outside a monitored region.

Finally, in some applications, it may not be possible or desirable to place a stationary reference tag within the field of interest. The multiple reference tag approach shown in FIG. 7 encircles a field of interest by geometrically placing monitoring stations 161-164 and reference tags in a circular pattern. Alternatively, the field of interest may be partially encircled. In the illustrated example, all reference tags 401, 402, 403 and 404 are placed outside of the middle "monitored" region, with each reference tag being used to detect the timing offsets between neighboring receivers. Again, using equation (5), the counter offsets between non-neighboring receivers can be determined, allowing precise measurement of location of any object tags located within the monitored area.

Embodiments described herein illustrate various ways to implement the apparatus and method aspects of the invention and are not intended to limit the scope of the invention. It is known to those skilled in the art that mathematical and/or geometric relationships or equivalents, other than those equations illustrated herein, may be used to perform the necessary computations to determine the location of an object or to obtain timing offset information for the various timers of the monitoring stations. Geometric patterns other than those illustrated may be used to arrange receivers and/or reference tags that define zones, and other mathematical relationships may be employed to compute or extrapolate timing offset between and among neighboring receivers. The layout of or geometric patterns of receivers and reference tags may obviously be arranged to conform to the needs of actual deployment. In addition, free-running counters, delay lines, or other circuits known now or as may become known may measure or detect time-of-arrival information to provide a computational basis to locate an object. The invention may be deployed utilizing a common clock source to synchronize the receivers, or by deploying accurate independent clocks at multiple receivers. Accordingly, the invention is not limited to the embodiments or methods shown and described but instead, is defined by the appended claims.

We claim:

1. An extensible zone-based object location system to determine a position of an object in any one of multiple zones of a region, the object having at least one associated object tag configured to transmit a RF signal, the system comprising:
    respective groups of receivers that define respective zones, wherein at least two zones share a receiver and wherein each receiver includes a timer to measure an arrival time of RF signals;
    a reference tag associated with each zone, wherein each reference tag is configured to transmit a RF signal from a known location within the zone; and
    a processing hub configured to obtain time-of-arrival information indicative of arrival times of RF signals transmitted by the object tag and at least one reference tag and configured to determine the position of the object within one of the multiple zones.

2. An extensible zone-based object location system of claim 1, wherein the processing hub is configured to obtain time of arrival information indicative of arrival times of RF signals transmitted by the object tag and two reference tags.

3. An extensible zone-based object location system of claim 2, wherein the respective zones of the two reference tags overlap.

4. An extensible zone-based object location system of claim 3, wherein the position of the object is within an overlapping portion of the respective zones of the two reference tags.

5. An extensible zone-based object location system of claim 2, wherein the respective zones of the two reference tags are adjacent.

6. An extensible zone-based object location system of claim 2, wherein the respective zones of the two reference tags are separated by a distance.

7. An extensible zone-based object location system of claim 2, wherein the multiple zones of a region comprise at least two rooms and wherein the respective zones of the two reference tags correspond to the two rooms to be monitored for object tag positions.

8. An extensible zone-based object location system of claim 2, wherein the position of the object is within the zone of one of the two reference tags and outside of the zone of the other of the two reference tags.

9. An extensible zone-based object location system of claim 1, wherein at least one zone is further defined by a virtual boundary.

10. An extensible zone-based object location system of claim 1, wherein each zone is defined by a RF signal transmission range.

11. An extensible zone-based object location system of claim 10, wherein the receivers of one zone are segmented into at least two virtual zones each defined by a virtual boundary, thereby defining virtual groups of receivers assigned to respective virtual zones.

12. An extensible zone-based object location system of claim 1, wherein the multiple zones of a region comprise at least one virtual zone defined by a virtual boundary, thereby defining a virtual group of receivers assigned to the virtual zone.

13. An extensible object location method to determine a position of an object having an associated object tag configured to transmit a RF signal, the method comprising:
    defining zones with respective groups of receivers in a monitored region in which to detect the object, wherein at least two of the groups of receivers share a common receiver;
    receiving a RF signal transmitted from a reference tag transmitter from a known location within a first one of the zones at two or more receivers of the group of receivers defining the first zone to determine timing offsets for the two or more receivers of the first zone;
    receiving a RF signal transmitted from an object tag of an object at the two or more receivers of the first zone to determine differences in time of arrival for the two or more receivers of the first zone; and
    determining the position of the object based on the timing offsets among the two or more receivers of the first zone and the differences in time of arrival of the object tag signal at the two or more receivers of the first zone.

14. An extensible object location method of claim 13, wherein the object tag is configured to transmit an ultra wideband signal.

15. An extensible object location method of claim 13, further comprising:
    receiving a RF signal transmitted from a reference tag transmitter from a known location within a second one of the zones at two or more receivers of the group of receivers defining the second zone to determine timing offsets for the two or more receivers of the second zone;
    receiving the RF signal transmitted from the object tag of the object at the two or more receivers of the second zone to determine differences in time of arrival for the two or more receivers of the second zone; and
    determining the position of the object based on the timing offsets among the two or more receivers of the second zone and the differences in time of arrival of the object tag signal at the two or more receivers of the second zone.

16. An extensible object location method of claim 15, wherein at least one receiver of the first zone is shared as a receiver of the second zone.

17. An extensible object location method of claim 15, further comprising discarding the determined position of the object based on the timing offsets among the two or more receivers of the second zone and the differences in time of arrival of the object tag signal at the two or more receivers of the second zone if the position of the object is determined to be outside the second zone.

18. An extensible object location method of claim 13, wherein defining zones with respective groups of receivers comprises defining at least one zone as a virtual zone defined by a virtual boundary.

19. An extensible object location method of claim 13, wherein defining zones with respective groups of receivers comprises defining at least two zones as virtual zones defined by virtual boundaries on opposing sides of a barrier, wherein the virtual boundaries are configured so that each receiver of each respective virtual zone has a direct line-of-sight throughout each respective virtual zone and to the reference tag transmitter for the virtual zone.

20. An extensible object location method to determine a position of an object having an associated object tag configured to transmit a RF signal, the method comprising:

provviding successive receivers to at least partially encircle a monitored region in which to detect the object and configured to receive RF signals;

providing a reference tag transmitter substantially between each of the receivers and configured to transmit a RF reference signal from a known location;

receiving the RF reference signal at two or more of the receivers thereby to determine timing offsets for the two or more receivers;

determining a timing offset for at least one of the receivers based on timing offsets of the at least two other receivers;

transmitting a RF object tag signal from the monitored region;

receiving the RF object tag signal at the two or more receivers; and determining the position of the object based on the timing offsets and differences in time of arrival of the RF object tag signal at the two or more receivers.

21. The method of claim 20, wherein the RF signals comprises ultra wideband signals.

\* \* \* \* \*